US012083699B2

(12) United States Patent
Gereg et al.

(10) Patent No.: US 12,083,699 B2
(45) **Date of Patent: *Sep. 10, 2024**

(54) MODULAR UNITS, CLAMPING ASSEMBLIES, AND SLICING MACHINES EQUIPPED THEREWITH

(71) Applicant: Urschel Laboratories, Inc., Chesterton, IN (US)

(72) Inventors: Dustin J. Gereg, Valparaiso, IN (US); Michael Scot Jacko, Valparaiso, IN (US)

(73) Assignee: Urschel Laboratories, Inc., Chesterton, IN (US)

(*) Notice: Subject to any disclaimer, the term of this patent is extended or adjusted under 35 U.S.C. 154(b) by 434 days.

This patent is subject to a terminal disclaimer.

(21) Appl. No.: 17/471,479

(22) Filed: Sep. 10, 2021

(65) Prior Publication Data

US 2021/0402640 A1 Dec. 30, 2021

Related U.S. Application Data

(62) Division of application No. 17/074,309, filed on Oct. 19, 2020, now Pat. No. 11,298,849, which is a division of application No. 15/891,788, filed on Feb. 8, 2018, now Pat. No. 10,807,268.

(60) Provisional application No. 62/457,205, filed on Feb. 10, 2017.

(51) Int. Cl.

| | |
|---|---|
| ***B26D 7/26*** | (2006.01) |
| ***B26D 1/36*** | (2006.01) |
| ***B26D 1/62*** | (2006.01) |
| ***B26D 3/28*** | (2006.01) |
| ***B26D 7/06*** | (2006.01) |

(52) U.S. Cl.
CPC ............. *B26D 7/2614* (2013.01); *B26D 1/36* (2013.01); *B26D 1/62* (2013.01); *B26D 3/28* (2013.01); *B26D 7/0691* (2013.01); *B26D 2210/02* (2013.01)

(58) Field of Classification Search
CPC ...... B26D 1/62; B26D 7/2624; B26D 7/2621; B26D 7/0691
USPC ........................................................... 83/403
See application file for complete search history.

(56) References Cited

U.S. PATENT DOCUMENTS

| | | | | |
|---|---|---|---|---|
| 8,714,068 B2 * | 5/2014 | Ornelaz, Jr. ......... | B26D 7/2614 83/403 |
| 10,780,602 B2 * | 9/2020 | Gereg .................. | B26D 7/0691 |
| 2014/0290451 A1 * | 10/2014 | Jacko .................. | B26D 7/0691 83/13 |

* cited by examiner

*Primary Examiner* — Adam J Eiseman
*Assistant Examiner* — Richard D Crosby, Jr.
(74) *Attorney, Agent, or Firm* — Hartman Global IP Law; Gary M. Hartman; Domenica N. S. Hartman

(57) ABSTRACT

A modular unit configured for mounting to a cutting head of a slicing machine and for securing a knife to the cutting head, and slicing machines equipped with one or more of such modular units. The modular unit includes mounting blocks adapted to be spaced apart in an axial direction of the cutting head, and a clamping assembly assembled with the mounting blocks so as to extend between the mounting blocks. The clamping assembly is configured to secure a knife to the cutting head, and at least portions of the clamping assembly may be removable from the cutting head by disassembling the clamping assembly from the mounting blocks without removing the mounting blocks from the cutting head.

23 Claims, 15 Drawing Sheets

MODULAR UNITS, CLAMPING ASSEMBLIES, AND SLICING MACHINES EQUIPPED THEREWITH

CROSS REFERENCE TO RELATED APPLICATIONS

This is a division patent application of U.S. patent application Ser. No. 17/074,309, filed Oct. 19, 2020, which is a division patent application of U.S. patent application Ser. No. 15/891,788 filed Feb. 8, 2018, now U.S. Pat. No. 10,807,268, which claims the benefit of U.S. Provisional Application No. 62/457,205 filed Feb. 10, 2017. The contents of these prior documents are incorporated herein by reference.

BACKGROUND OF THE INVENTION

The present invention generally relates to machines for cutting products, including but not limited to slicing food products. The invention particularly relates to a clamping assembly for securing a knife to a slicing machine.

Various types of equipment are known for slicing, shredding and granulating food products, as nonlimiting examples, vegetables, fruits, dairy products, and meat products. Widely used machines for this purpose are commercially available from Urschel Laboratories, Inc., and include machines under the names Model CC® and Model CCL. The Model CC and CCL machines are centrifugal-type slicers capable of slicing a wide variety of products at high production capacities. The Model CC® line of machines is particularly adapted to produce uniform slices, strip cuts, shreds and granulations, and the Model CCL line is particularly adapted to produce slices or chips of a waffle or lattice type. Certain configurations and aspects of Model CC® machines are represented in U.S. Pat. Nos. 3,139,128, 3,139,129, 5,694,824 and 6,968,765, the entire contents of which are incorporated herein by reference. Certain configurations and aspects of Model CCL machines are represented in U.S. Pat. Nos. 3,139,127 and 3,139,130, the entire contents of which are incorporated herein by reference.

FIG. 1 schematically depicts a machine 10 representative of a Model CC® machine. The machine 10 includes a generally annular-shaped cutting head 12 equipped with cutting knives (not shown) mounted at its inner circumference. An impeller 14 is coaxially mounted within the cutting head 12 and has an axis 17 of rotation that coincides with an axis of the cutting head 12. The impeller 14 is rotationally driven about its axis 17 through a shaft that is enclosed within a housing 18 and coupled to a gear box 16. The cutting head 12 is mounted on a support ring 15 above the gear box 16 and remains stationary as the impeller 14 rotates. Products are delivered to the cutting head 12 and impeller 14 through a feed hopper 11 located above the impeller 14. In operation, as the hopper 11 delivers products to the impeller 14, centrifugal forces cause the products to move outward into engagement with the knives of the cutting head 12. The impeller 14 comprises generally radially-oriented paddles 13, each having a face that engages and directs the products radially outward toward and against the knives of the cutting head 12 as the impeller 14 rotates. Other aspects pertaining to the construction and operation of Model CC® machines, including improved embodiments thereof, can be appreciated from U.S. Pat. Nos. 3,139,128, 3,139,129, 5,694,824, 6,968,765, 7,658,133, 8,161,856, 9,193,086, 9,469,041, and 9,517,572 and U.S. Patent Application Publication Nos. 2016/0158953 and 2016/0361831.

FIG. 2 is an isolated view of the cutting head 12 of FIG. 1, and FIG. 3 is a fragmentary bottom view of the cutting head 12. The cutting head 12 is generally annular-shaped with cutting knives 20 mounted on its perimeter. Each knife 20 projects radially inward in a direction generally opposite the direction of rotation of the impeller 14, and defines a cutting edge at its radially innermost extremity. The cutting head 12 shown in FIG. 2 further comprises a lower support ring 22, an upper support ring 24, and circumferentially-spaced support segments, referred to herein as shoes 26. The knives 20 of the cutting head 12 are individually secured with clamping assemblies 28 to the shoes 26. Each clamping assembly 28 includes a knife holder 28A mounted with fasteners 29 to the radially inward-facing side of a shoe 26, and a clamp 28B mounted on the radially outward-facing side of a shoe 26 to secure a knife 20 to the knife holder 28A. The shoes 26 are represented as secured with fasteners 30 to the support rings 22 and 24. The shoes 26 are equipped with coaxial pivot pins (not shown) that engage holes in the support rings 22 and 24. By pivoting on its pins, the orientation of a shoe 26 can be adjusted to alter the radial location of the cutting edge of its knife 20 with respect to the axis of the cutting head 12, thereby controlling the thickness of the sliced food product. As an example, adjustment can be achieved with an adjusting screw and/or pin 32 located circumferentially behind the pivot pins. FIG. 2 further shows optional gate insert strips 34 mounted with fasteners 35 to each shoe 26, which the food product crosses prior to encountering the knife 20 mounted to the succeeding shoe 26.

FIGS. 2 and 3 show the knives 20 and clamps 28B secured to their respective knife holders 28A with fasteners 36. Alignment of the knife 20 and clamp 28B of each assembly 28 is achieved with pins 38 that protrude from the support surface of the knife holder 26B. As better understood through the detail view of FIG. 4, the opposing surfaces of the knife holder 28A and clamp 28B result in the clamp 28B applying a force to the knife 20 adjacent its cutting edge. FIG. 5 shows an isolated exploded view of a shoe 26 and clamping assembly 28 of the cutting head 12 of FIGS. 2 and 3.

FIGS. 6 and 7 depict a quick-clamping assembly 40 that can be used in lieu of the fasteners 36 shown in FIGS. 2 and 3. The clamping assembly 40 comprises a knife holder 40A and clamp 40B, the latter of which may be similar if not identical to the clamp 28B of FIGS. 2 and 3. The knife holder 40A includes an insert 42 that supports the knife 20 near its cutting edge and serves to protect the edge of the knife holder 40A from stones or other debris that are often accompany food products that undergo slicing. The knife holder 40A and clamp 40B are loosely assembled together with a fastener 44 that is installed in the knife holder 40A, passes through the clamp 40B, and is threaded into a clamping bar 46. An eccentric clamping rod 48 is disposed within a recess 50 formed in a surface of the knife holder 40A, and has a flat 52 defined on its otherwise cylindrical peripheral surface. The clamping rod 48 is situated between and contacts the knife holder 40A and a proximal end of the clamp 40B opposite the knife 20. The rod 48 can be rotated between clamping and release positions, which serve to secure and release, respectively, the knife 20. The clamping position is depicted in FIG. 6 and results from the proximal end of the clamp 40B being engaged by the cylindrical surface of the rod 48, which forces the proximal end outward away from the knife holder 40A and, with the clamping bar 46 serving as a fulcrum, forces the oppositely-disposed end of the clamp 40B into engagement with the knife 20. The force applied to the clamp 40B by the rod 48 can be released by rotating the rod 48 so that its flat 52 faces the proximal end of the clamp 40B.

While the Model CC® has performed extremely well for its intended purpose, further improvements are continuously desired and sought for slicing machines of the type represented by the Model CC®.

BRIEF DESCRIPTION OF THE INVENTION

The present invention provides a modular unit configured for mounting to a cutting head of a slicing machine and for securing a knife to the cutting head, and to slicing machines equipped with one or more of such modular units.

According to one aspect of the invention, the modular unit comprises mounting blocks that are spaced apart in an axial direction of the cutting head, and a clamping assembly assembled with the mounting blocks so as to be between the mounting blocks. According to a preferred aspect of the invention, the clamping assembly is configured to secure a knife to the cutting head, and at least portions of the clamping assembly are removable from the cutting head by disassembling the clamping assembly from the mounting blocks without removing the mounting blocks from the cutting head.

According to another preferred aspect of the invention, the clamping assembly comprises a knife holder, a knife supported by the knife holder, a clamp overlying the knife holder so that the knife is between the knife holder and the clamp, and a cam rod that secures the clamp to the knife holder and clamps the knife therebetween. The cam rod has a camming portion that contacts a radially outer surface of the clamp, and the cam rod is rotatable to have a clamping position and a release position. The camming portion applies a force that clamps the clamp against the knife holder when the cam rod is in the clamping position, and the camming portion releases the force against the clamp when the cam rod is in the release position.

Other aspects of the invention include a slicing machine having a cutting head equipped with at least one modular unit as described above.

Technical aspects of modular units described above preferably include the ability of components of the modular unit to be replaced to accommodate various types and configurations of knives, and the ability of the cam rod to quickly and reliably clamp and release the knife simply by rotating the rod.

Other aspects and advantages of this invention will be better appreciated from the following detailed description.

DETAILED DESCRIPTION OF THE INVENTION

Figure 1:
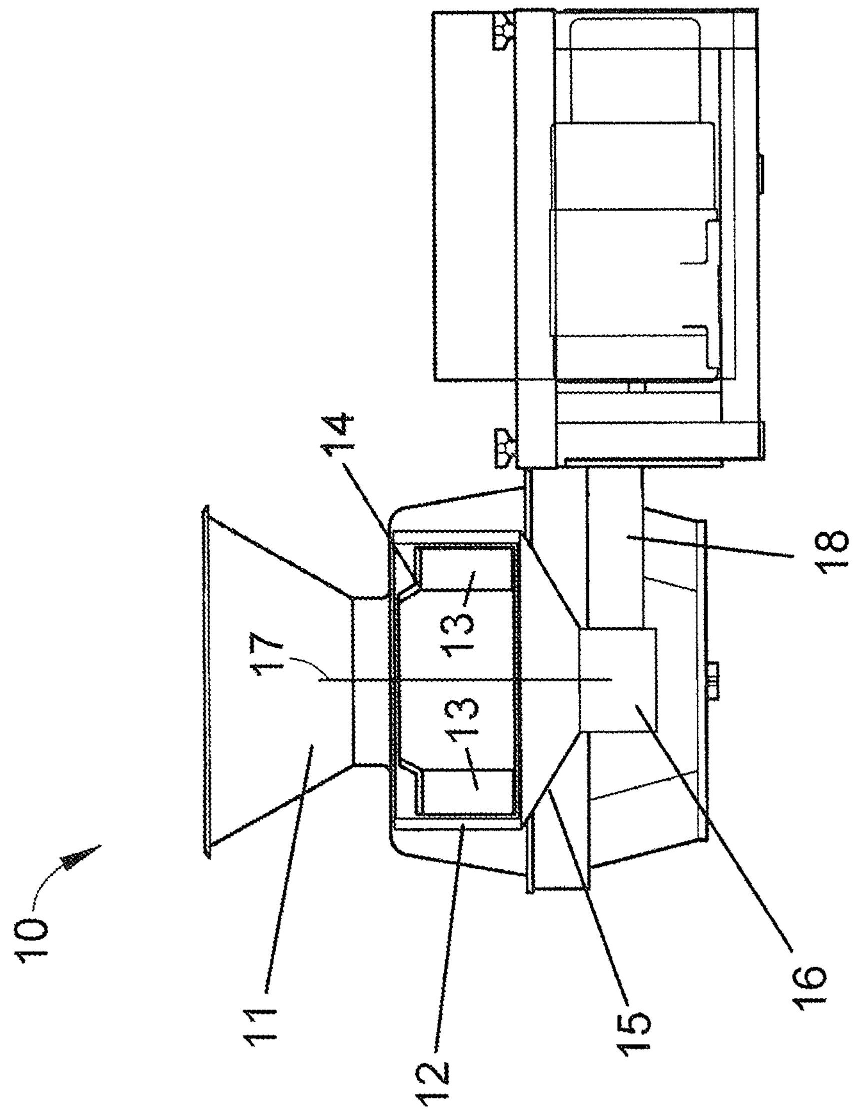
FIG. 1 PRIOR ART
FIG. 1 schematically represents a side view in partial cross-section of a slicing machine known in the art.
Figure 2:
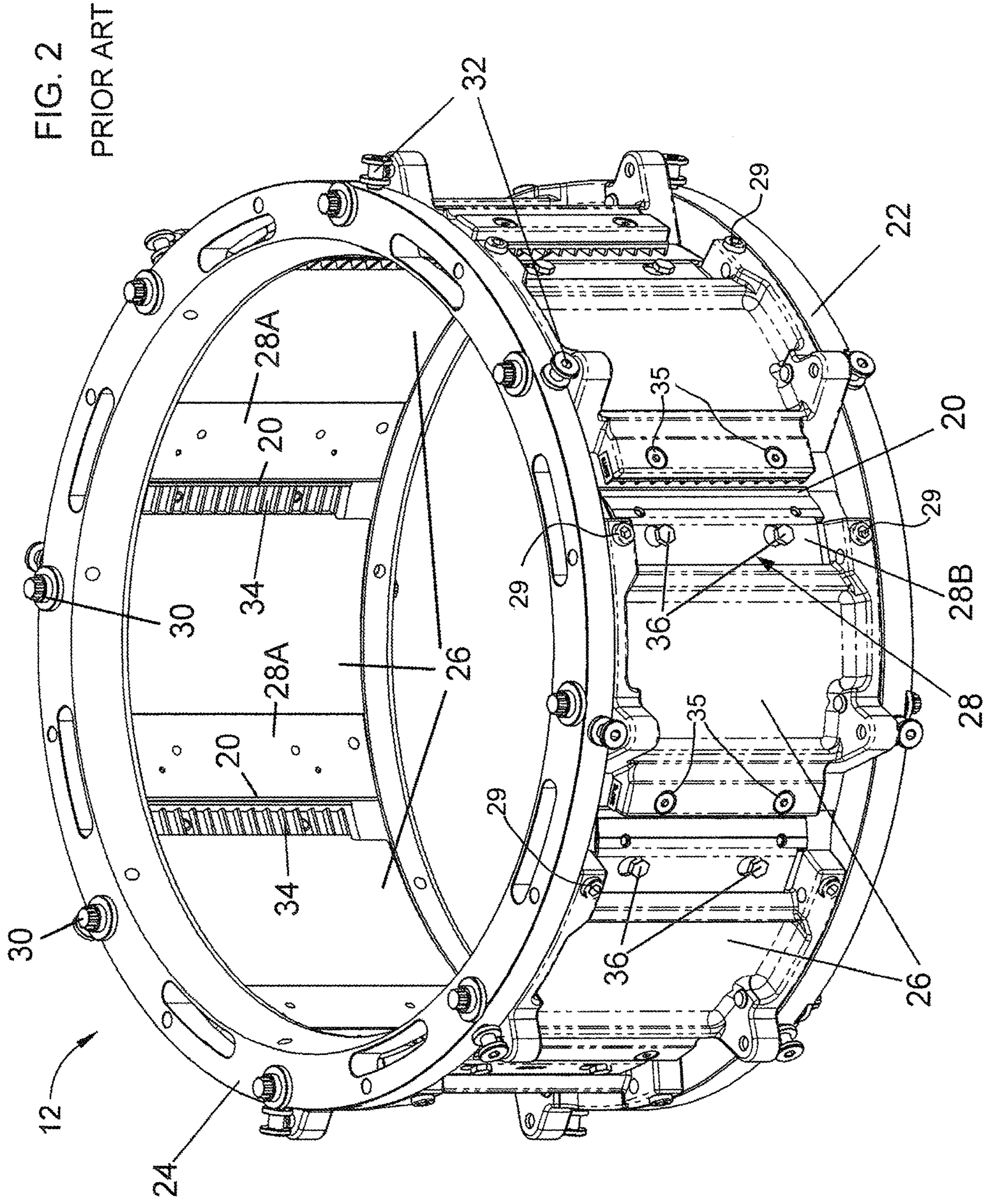
FIG. 2 PRIOR ART
FIG. 2 is a perspective view representing a cutting head of a type suitable for use with the slicing machine of FIG. 1.
Figure 3:
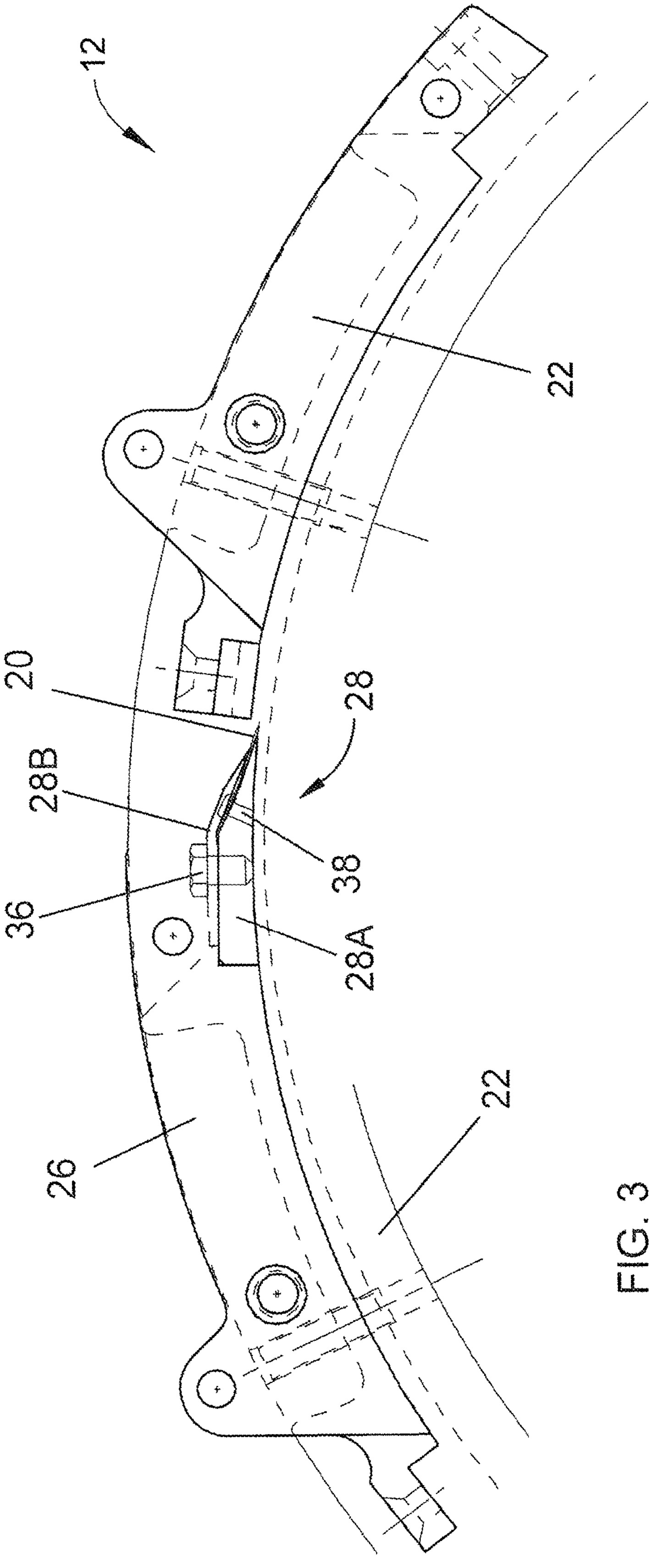
FIG. 3 PRIOR ART
FIG. 3 is a bottom view showing a fragment of the cutting head of FIG. 2.
Figure 4:
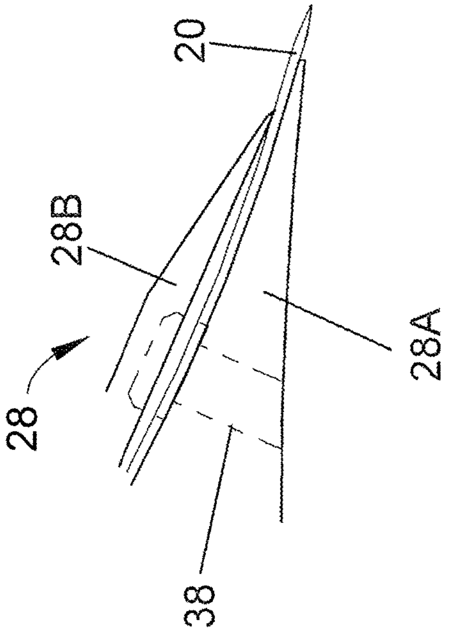
FIG 4 PRIOR ART
FIG. 4 is a detailed view of a portion of a clamping assembly of the cutting head.
Figure 5:
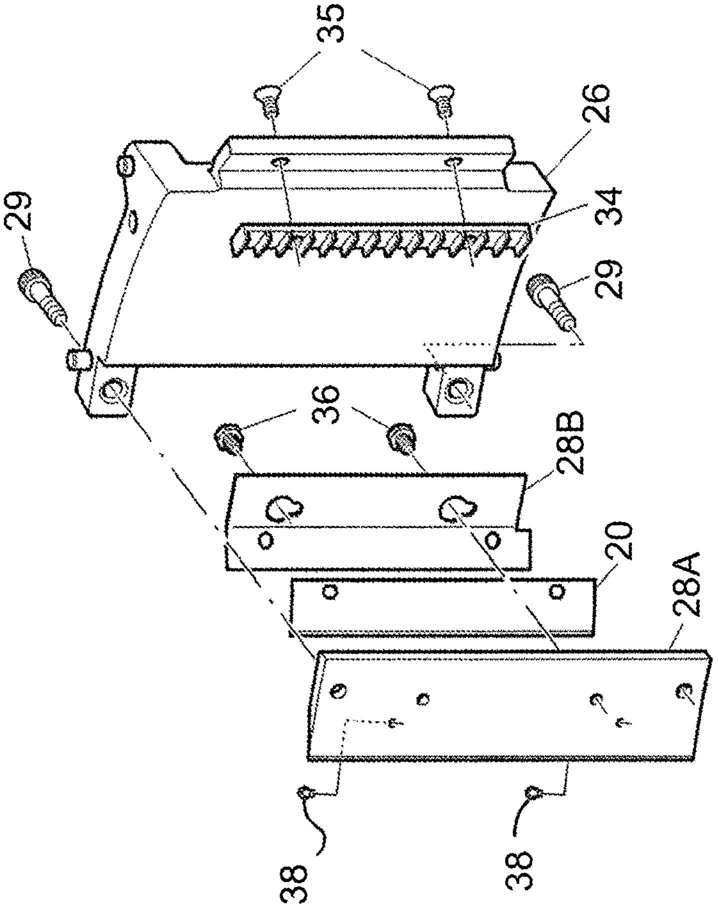
FIG. 5 PRIOR ART
FIG. 5 is an isolated exploded view of a shoe and a clamping assembly of the cutting head of FIGS. 2 and 3.
Figure 6:
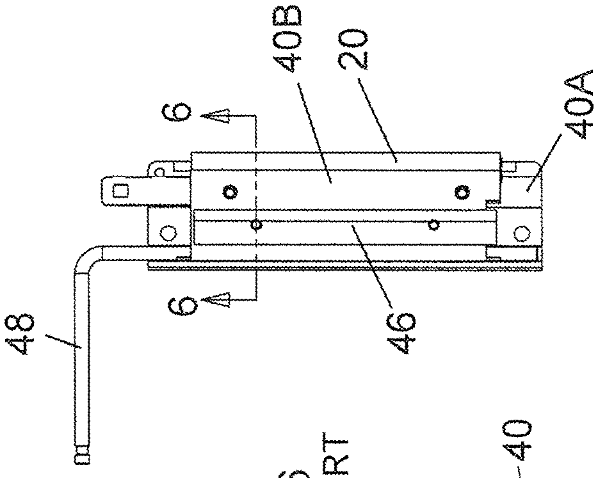
FIG. 6 PRIOR ART
FIGS. 6 and 7 are side and cross-sectional views, respectively, of an alternative clamping assembly capable of use with the cutting head of FIG. 2.
Figure 7:
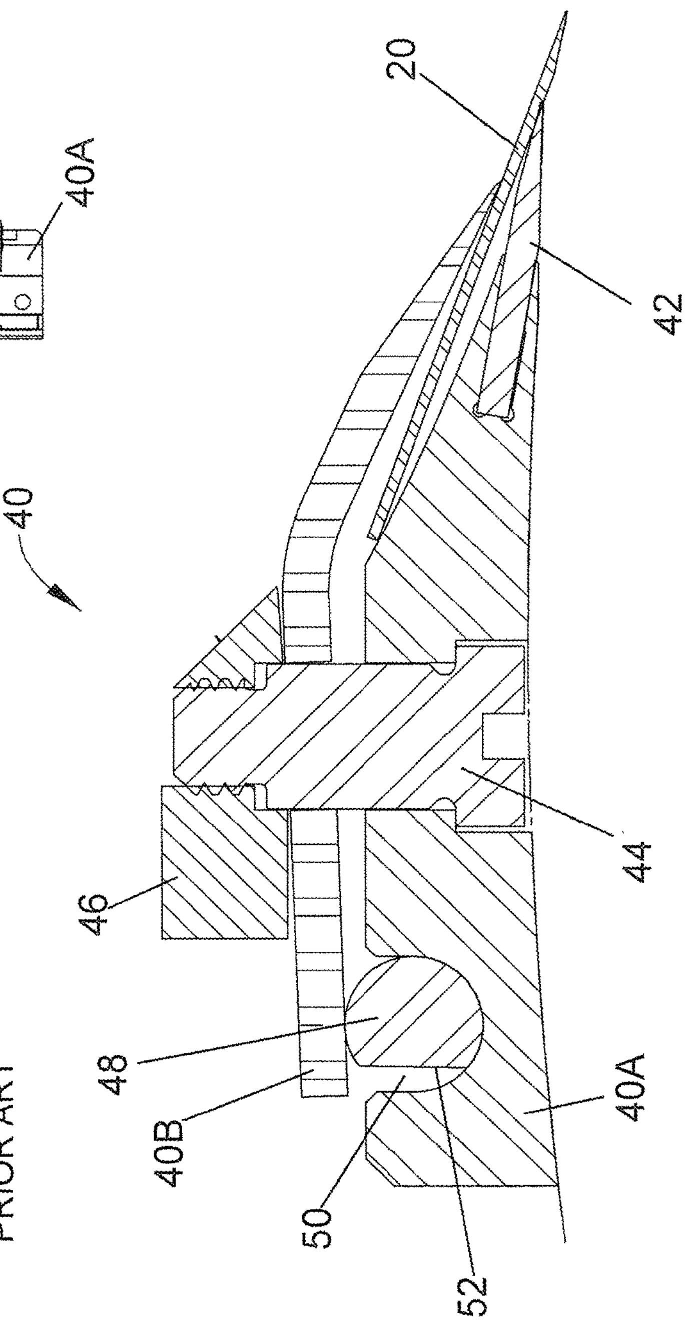
FIG. 7 PRIOR ART
Figure 8:
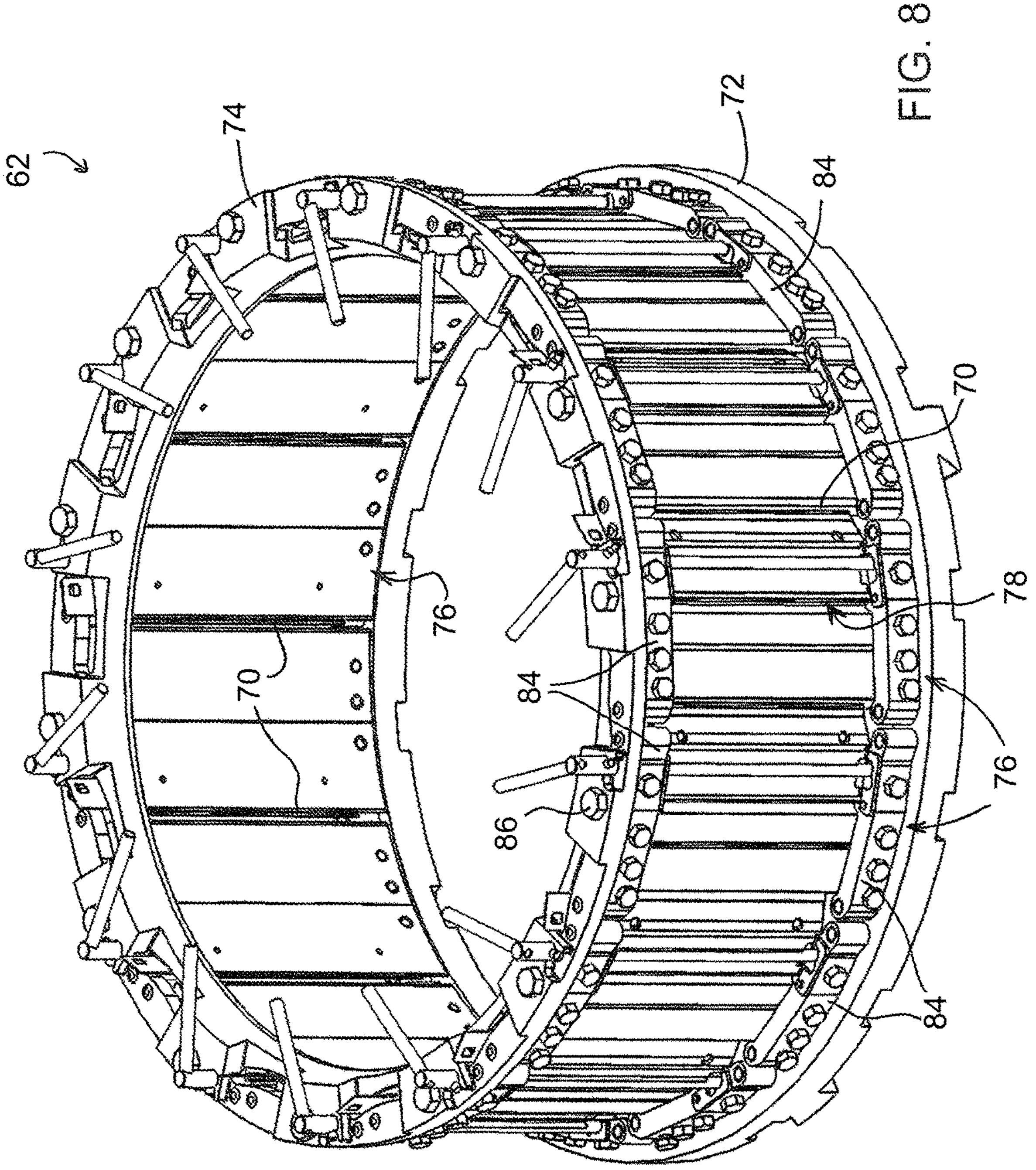
FIG. 8 is a perspective view representing a cutting head in accordance with a nonlimiting embodiment of the invention.

FIG. 8 represents a cutting head 62 that is capable of use with a variety of cutting machines, including the slicing machine 10 depicted in FIG. 1, and in some instances may be a modification or retrofit for such a machine. FIGS. 9 through 25 contain various views of nonlimiting embodiments that utilize one or more modular units 76 to secure knives 70 to the cutting head 62. The cutting head 62 will be described hereinafter in reference to the slicing machine 10 of FIG. 1 equipped with an impeller 14 as described in reference to FIG. 1, and as such the following discussion will focus primarily on certain aspects of the invention, whereas other aspects not discussed in any detail may be, in terms of structure, function, materials, etc., essentially as was described in reference to FIGS. 1 through 7. However, it will be appreciated that the teachings of the invention are more generally applicable to other types of cutting machines.

To facilitate the description provided below of the embodiments represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the cutting head 62 as it would be mounted in the machine 10 of FIG. 1. On the basis of a coaxial arrangement of the cutting head 62 and the impeller 14 of the machine 10, relative terms including but not limited to “axial,” “circumferential,” “radial,” etc., and related forms thereof may also be used below to describe the nonlimiting embodiments represented in the drawings. All such relative terms are intended to indicate the construction and relative orientations of components and features of the cutting head 62, and therefore are relative terms that are useful to describe the illustrated embodiments but should not be otherwise interpreted as limiting the scope of the invention.

In the isolated view of FIG. 8, the cutting head 62 can be seen to be generally annular-shaped with cutting knives 70 mounted at its perimeter. Each knife 70 projects radially inward in a direction generally opposite the direction of rotation of the impeller 14 within the cutting head 62, and defines a cutting edge at its radially innermost extremity. The cutting head 62 shown in FIG. 8 further comprises lower and upper support rings 72 and ring 74 to and between which the circumferentially-spaced modular units 76 are mounted. The knives 70 of the cutting head 62 are individually secured with clamping assemblies 78 to the modular units 76. As more readily evident in FIGS. 9, 10, and 11, the clamping assembly 78 of each modular unit 76 includes a knife holder 80 mounted with fasteners 82 to and between a pair of mounting blocks 84, which in turn are configured to be secured to the support rings 72 and 74 with fasteners 86. Due to the positions of the rings 72 and 74 in the cutting head 62, the mounting blocks 84 are spaced apart in an axial direction of the cutting head 62. The fasteners 86 preferably rigidly secure the mounting blocks 84 to the rings 72 and 74. The clamping assembly 78 further includes a clamp 81 mounted between the mounting blocks 84 so that the clamp 81 is positioned on the radially outward-facing side of the holder 80 to secure the knife 70 thereto. The clamp 81 is preferably pivotably mounted to the mounting blocks 84, and in the embodiment shown the fasteners 86 that secure the mounting blocks 84 to the rings 72 and 74 extend through the blocks 84 to also serve as pivot pins for the clamp 81. The mounting blocks 84 are equipped with pins 88 that engage holes in the support rings 72 and 74. By appropriately locating the holes in the rings 72 and 74, the orientation of the mounting blocks 84, and consequently the knife 70, knife holder 80, and clamp 81 mounted thereto, can be used to alter the radial location of the cutting edge of the knife 70 with respect to the axis of the cutting head 62, thereby providing relatively coarse control of the thickness of the sliced food product. FIGS. 8 through 11 further show each modular unit 76 as comprising an adjustable gate 90 secured to the mounting blocks 84 with fasteners 92. A food product crosses the gate 90 prior to encountering the knife 70 mounted to the succeeding modular unit 76. To provide relatively fine control of the thickness of the sliced food product, the mounting blocks 84 are equipped with adjustment screws 94 that engage the gates 90 to alter the radial location of a trailing edge 96 of the gate 90 relative to the cutting edge of the succeeding knife 70.

Figure 10:
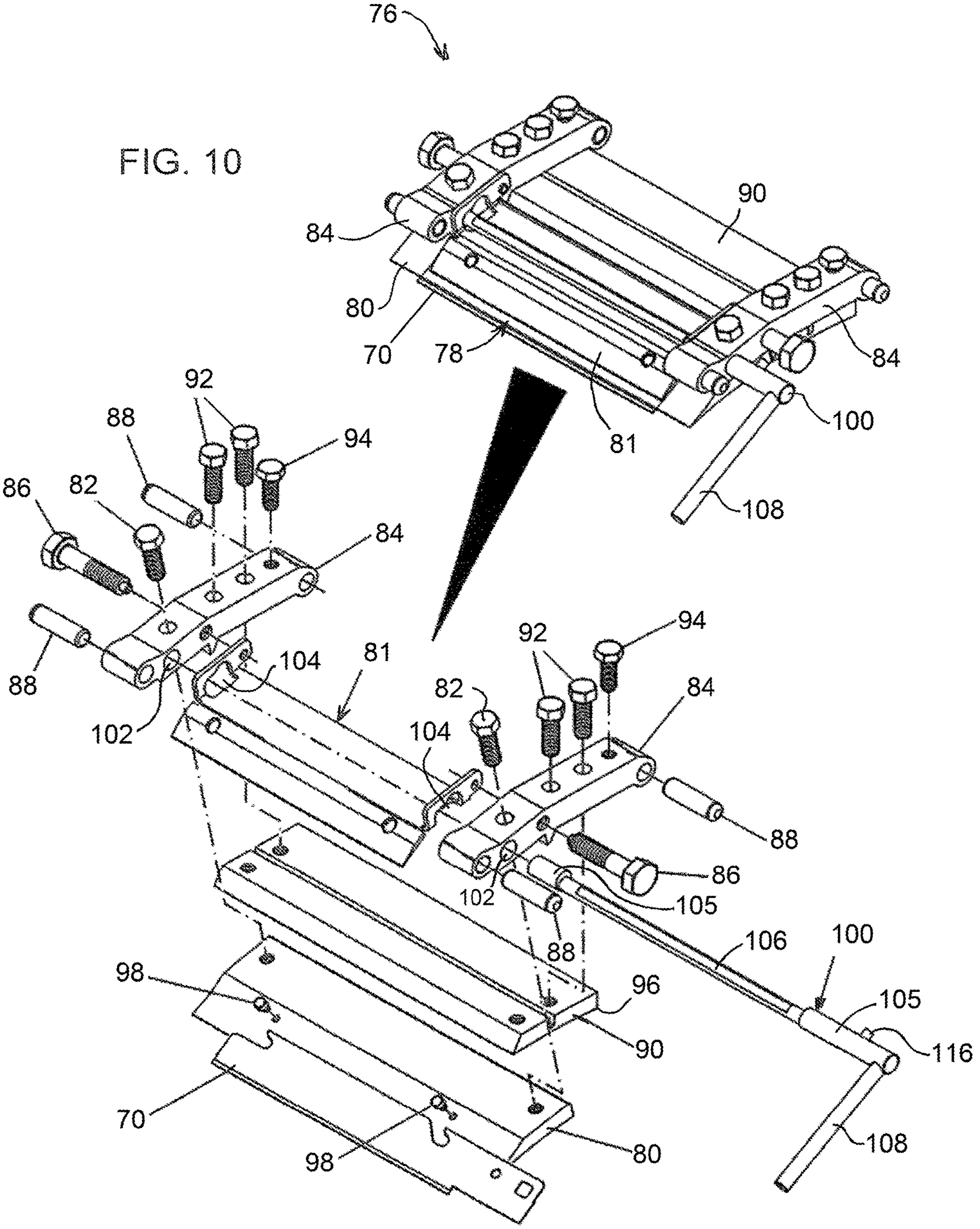
FIG. 10 contains isolated perspective and exploded views of the modular unit of FIG. 9.
Figure 11:
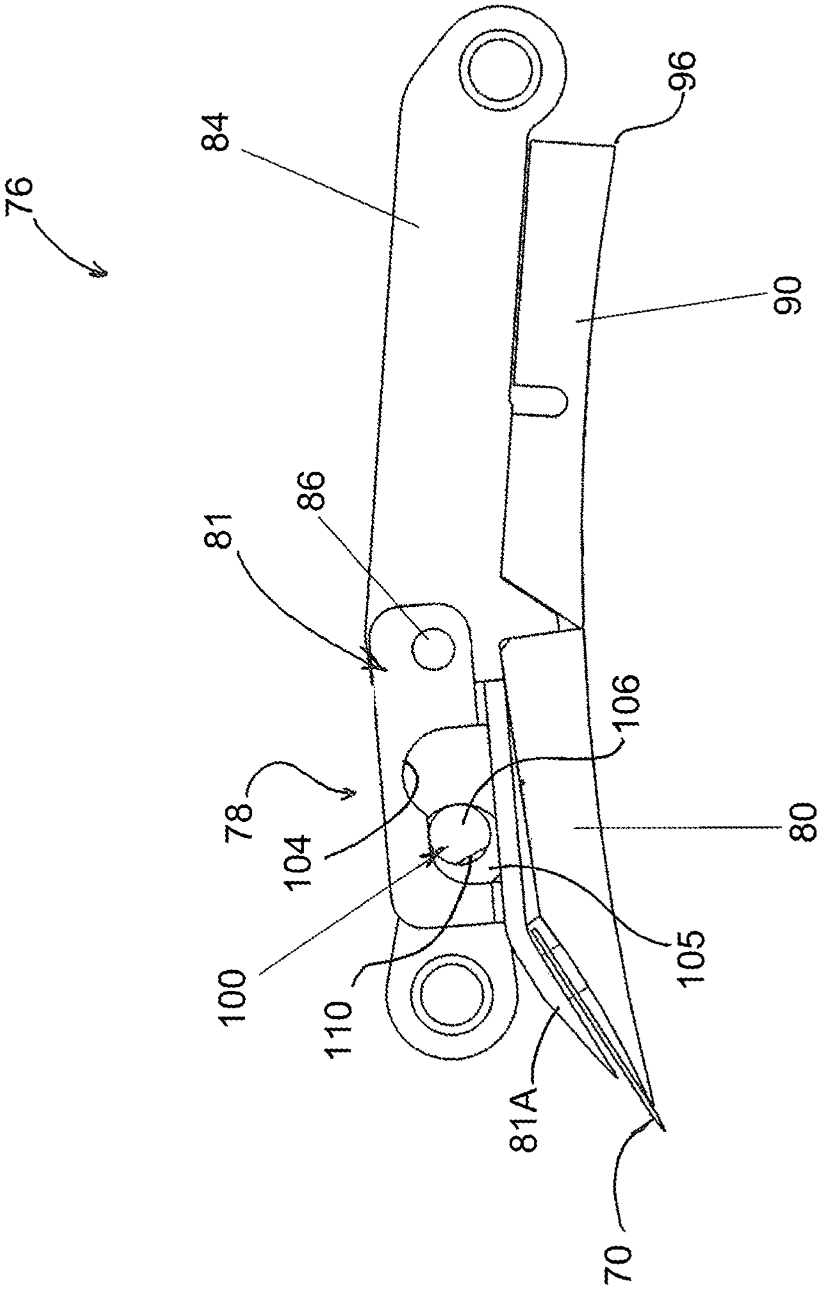
FIG. 11 is a cross-sectional view of a modular unit of the type represented in FIGS. 8 through 10.

As more readily apparent from FIGS. 10 and 11, the knife 70 is supported by a radially outer surface of the knife holder 80, and the clamp 81 overlies the holder 80 so that the knife 70 is between the surface of the holder 80 and a radially inward surface of the clamp 81 that faces the holder 80. Alignment of the knife 70, holder 80, and clamp 81 is achieved with pins 98 that protrude from the knife holder 80 into complementary slots and holes in, respectively, the knife 70 and clamp 81. As evident from FIG. 11, by forcing the clamp 81 toward the holder 80, an extension 81A of the clamp 81 will apply a clamping force to the knife 70 adjacent its cutting edge. According to a preferred aspect of the invention, an eccentric cam rod 100 is used as a quick-clamping feature to apply the clamping force to the clamp 81. The cam rod 100 passes through holes 102 in the mounting blocks 84 and through complementary holes 104 on upstanding flanges 81B (FIG. 11) located at opposite ends of the clamp 81 to loosely assemble the clamp 81 to the mounting blocks 84 in combination with the pivot axis of the clamp 81 created by the fasteners 86.

The cam rod 100 comprises a camming portion 106 that engages and disengages the clamp 81 when the rod 100 is rotated between clamping and release positions, which serve to secure and release, respectively, the knife 70. The release position is depicted in FIG. 11 and results from the camming portion 106 being disengaged from the clamp 81, whereas clockwise rotation of the rod 100 (as viewed in FIG. 11) causes its camming portion 106 to eccentrically move into engagement with the surface of the clamp 81, forcing the clamp 81 into engagement with the knife 70. The force applied to the clamp 81 by the camming portion 106 can be released by rotating the cam rod 100 counterclockwise.

Figure 9:
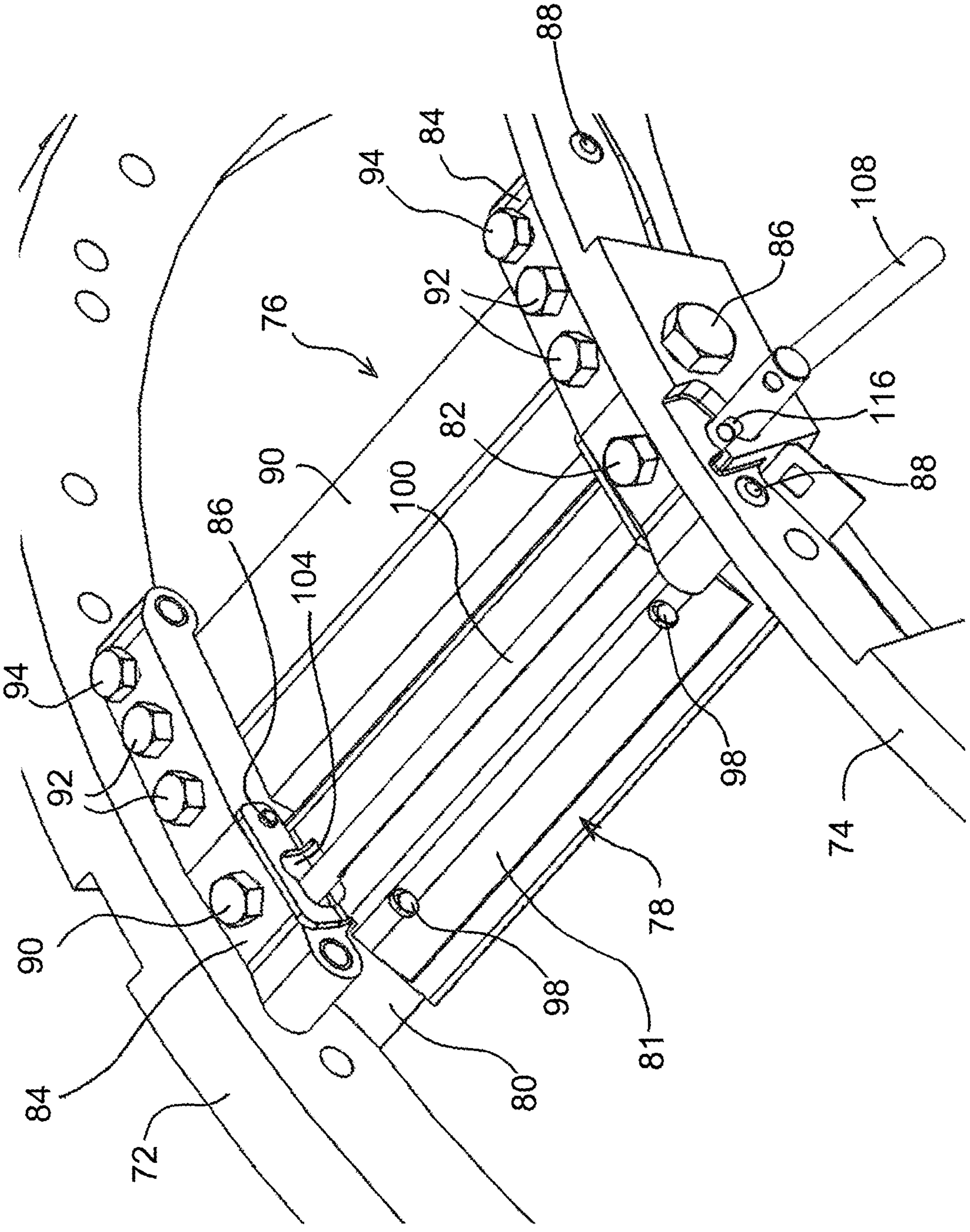
FIG. 9 is a perspective view of an individual modular unit of the cutting head of FIG. 8.

In the illustrated embodiment, the cam rod 100 is rotatably mounted to the mounting blocks 84 of the modular unit 76 as a result of its oppositely-disposed ends 105 being received in the holes 102 formed in the blocks 84. The ends 105 of the cam rod 100 are preferably coaxial, whereas the camming portion 106 between the ends 105 is eccentric to the ends 105 as well as the holes 102 in which the ends 105 are received, in other words, the axis of the camming portion 106 is parallel but not coaxial with the ends 105 of the cam rod 100. The rod 100 is able to rotate within the holes 102 between the aforementioned clamping and release positions. A handle 108 is provided at one end of the rod 100 to facilitate its rotation by hand. In the illustrated embodiment, the handle 108 is attached to the rod 100 so as to be disposed above the support ring 74 as seen in FIGS. 8 and 9.

The operation of the modular unit 76 will now be discussed in reference to FIGS. 12 through 15, which represent the knife 70 as having a straight cutting edge for producing flat slices. Knives having straight cutting edges will be referred to herein as “flat” knives. As will be subsequently discussed in reference to FIGS. 16 through 19, knives of other shapes can be used to produce sliced, strip-cut, shredded and granulated products.

Figure 13:
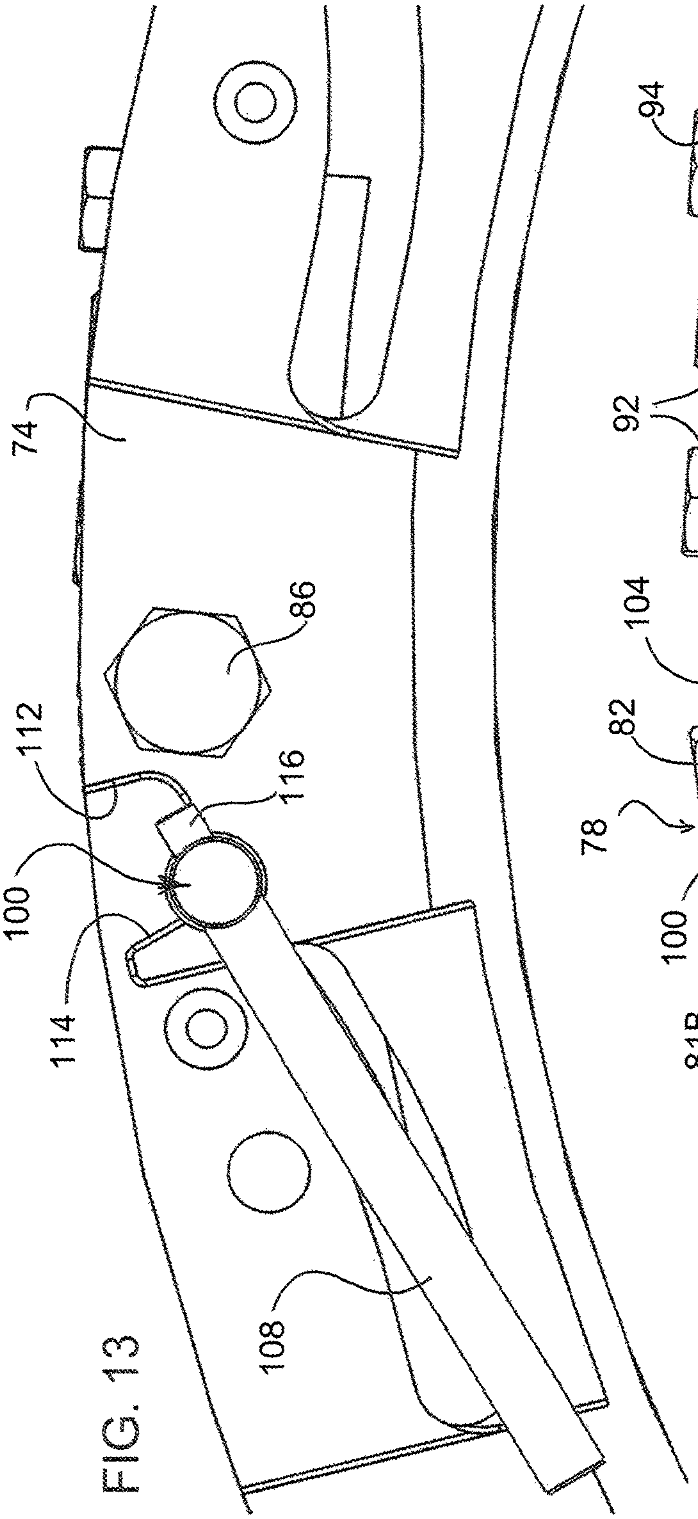
FIG. 13 is an end view representing the position of a lever relative to a support ring to which the modular unit of FIG. 12 is mounted.
Figure 12:
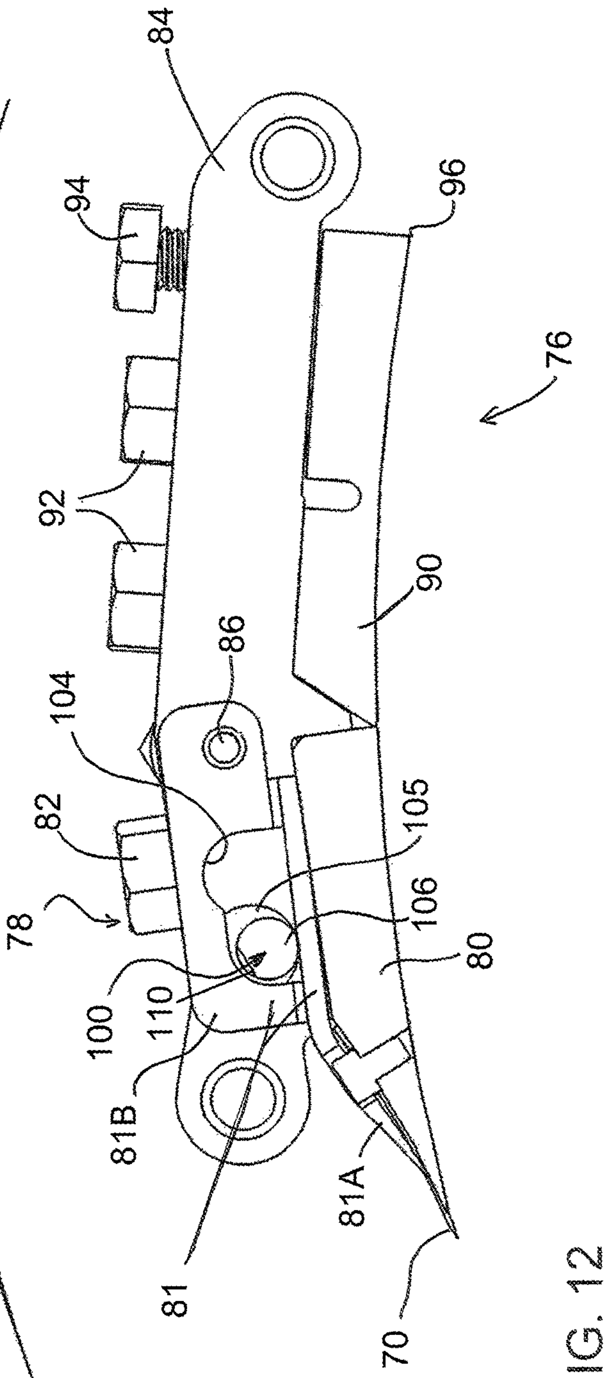
FIG. 12 is a cross-sectional view of the modular unit of FIG. 11 showing the unit in a closed position by which a flat knife is secured to the unit.
Figure 15:
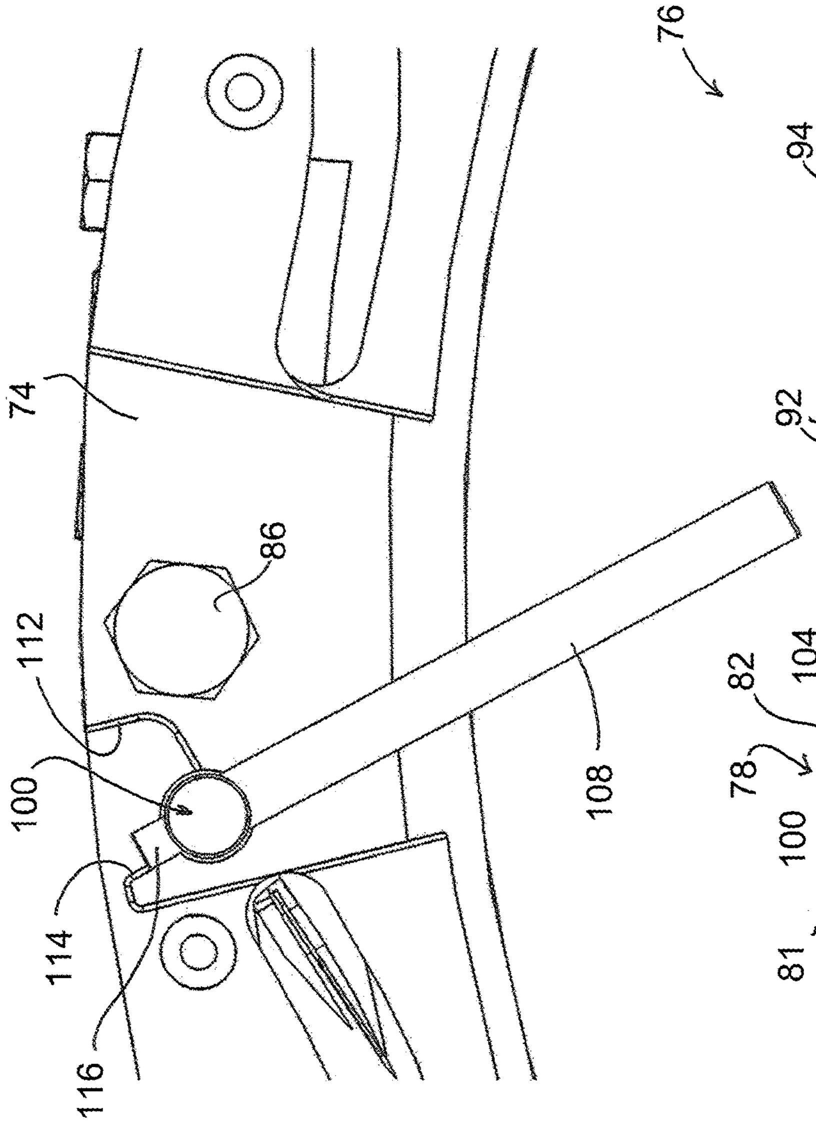
FIG. 15 is an end view representing the position of the lever relative to the support ring.

In FIG. 12, which shows the cam rod 100 in its clamping position, the camming portion 106 is represented as having a cylindrical shape that defines an arcuate camming surface, which contacts the outer surface of the clamp 81 and forces the clamp 81 toward the knife holder 80. In the clamping position, the camming portion 106 is at its closest proximity to the knife holder 80 due to the eccentricity of the camming portion 106, with the result that the camming portion 106 applies an increasingly greater force to the clamp 81 as the camming portion 106 is rotated in the clamping direction (clockwise in FIGS. 12 through 15). As a result, the knife 70 is clamped between the knife holder 80 and clamp 81. FIG. 13 represents the clamping position of the cam rod 100 as being established by a stop 112 defined by the support ring 74. The stop 112 limits the clockwise rotation of the cam rod 100, which has a protrusion (pin) 116 that abuts the stop 112 when the cam rod 100 is in the clamping position.

The nonlimiting embodiment of the camming portion 106 shown in the drawings further comprises a planar surface 110, represented as lying on a chord of the otherwise circular cross-sectional outline defined by the camming portion 106. As seen in FIG. 12, the planar surface 110 faces away from the clamp 81 when the camming portion 106 is in the clamping position. The planar surface 110 is preferably present on the camming portion 106 to provide greater clearance for slices that travel over the knife 70 and the outer surface of the clamp 81 as the slices exit the cutting head 62.

Figure 14:
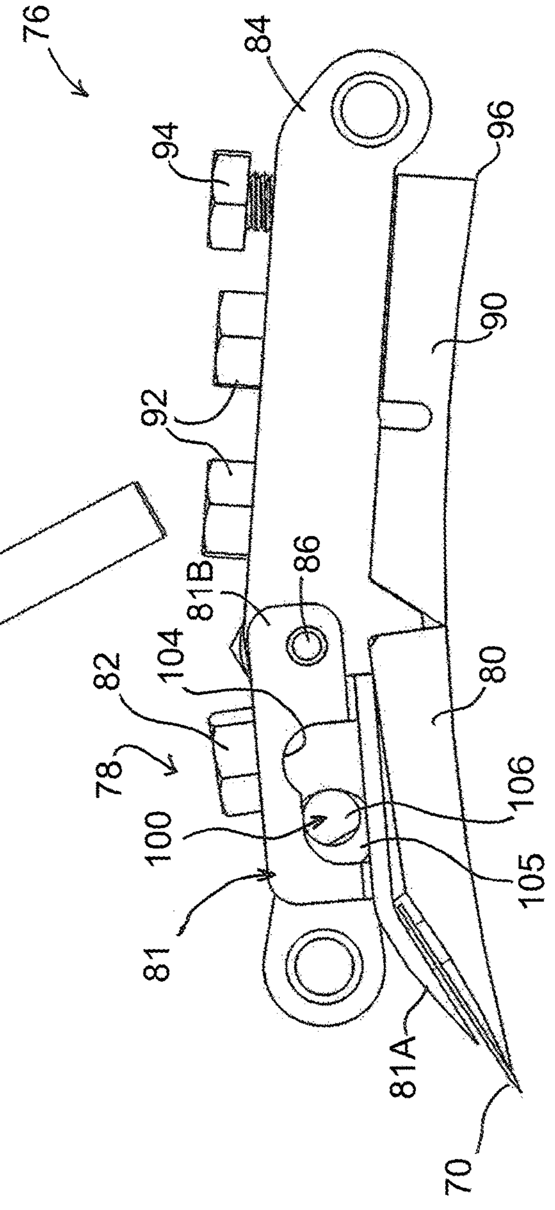
FIG. 14 is a cross-sectional view of the modular unit of FIGS. 11 and 12 showing the unit in an open position by which the flat knife is released from the unit.

The result of rotating the camming portion 106 of the rod 100 to its release position (counterclockwise in FIG. 12) is depicted in FIG. 14, which shows the camming portion 106 as being rotated out of engagement with the clamp 81 to release the force that had been applied by the rod 100 against the clamp 81. In the release position, which is represented in the drawings as the result of rotating the camming portion 106 about ninety degrees from its clamping position, the camming portion 106 is at an intermediate distance from the knife holder 80 due to its eccentricity. The camming portion 106 can be seen to have engaged the rim of the hole 104 in the clamp 81, causing the clamp 81 to pivot radially outward about its pivot (fastener 86) and disengage the knife 70. From FIG. 14, it should be apparent that rotating the camming portion 106 about 180 degrees from the clamping position would result in the camming portion 106 being at its greatest distance from the knife holder 80. However, the rotation of the cam rod 100 is limited by a stop 114 defined by the support ring 74, which the rod protrusion 116 abuts when the cam rod 100 is in the release position. Even so, the clamping force applied by the camming portion 106 has been sufficiently released to enable the clamp 81 to be loosened and raised off the surface of the knife 70 as illustrated in FIG. 14. Because the knife 70 is no longer clamped between the knife holder 80 and clamp 81, the knife 70 can be removed from the modular unit 76. From FIGS. 12 through 15, it can be appreciated that the flat knife 70 can be quickly secured and released by rotating the rod 100 between its clamping and release positions.

Figure 16:
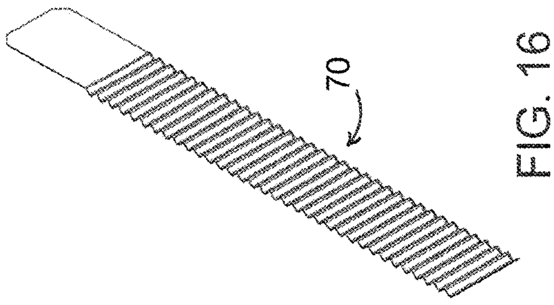
FIG. 16 is a perspective view of a shaped knife.
Figure 18:
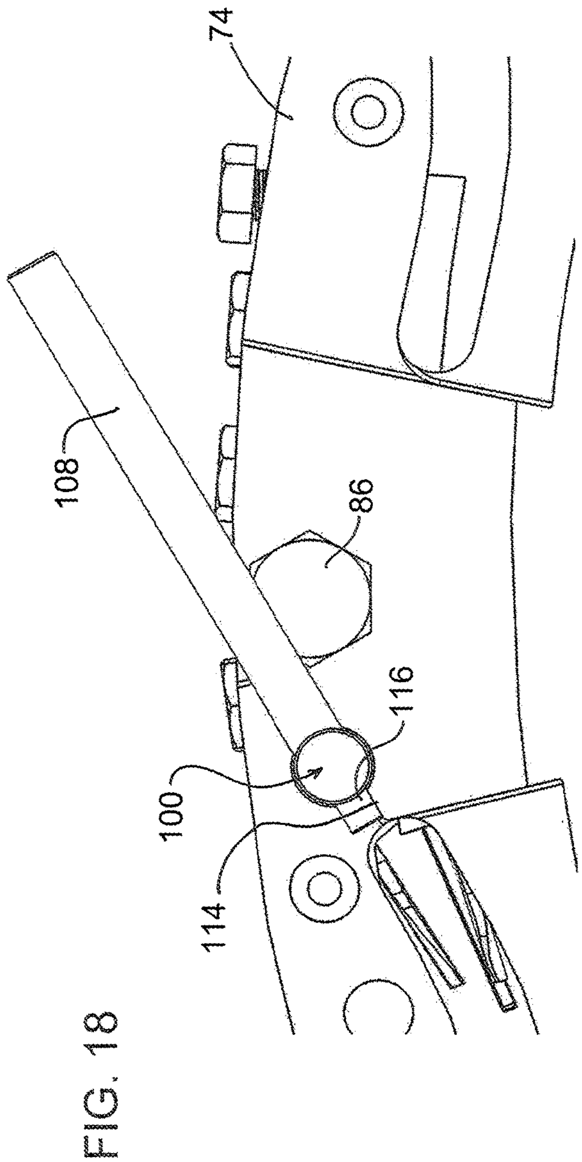
FIG. 18 is an end view representing the position of the lever relative to a support ring modified for use with the shaped knife of FIG. 16.
Figure 17:
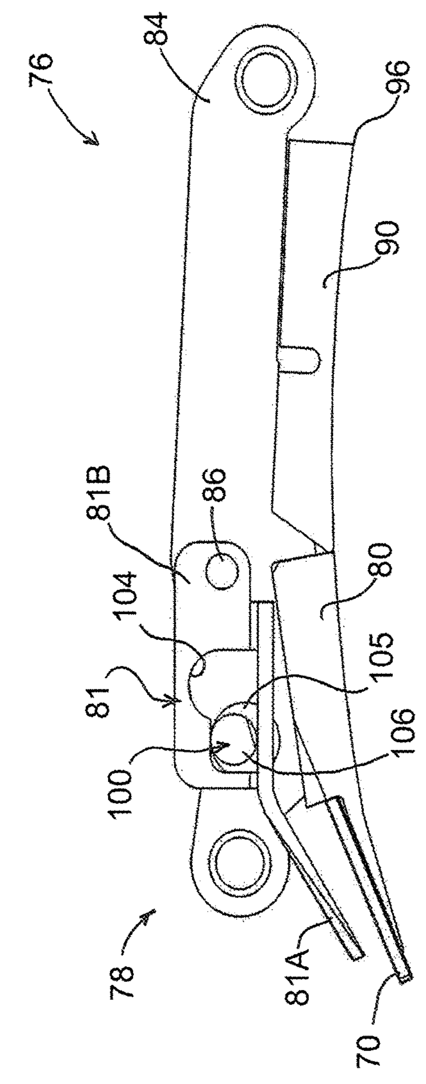
FIG. 17 is a cross-sectional view of the modular unit of FIGS. 11, 12 and 14 showing the unit in an open position by which a shaped knife is released from the unit.

FIGS. 16 through 19 represent how knives having shapes other than flat can be utilized with the modular unit 76 to produce other than flat sliced products. FIG. 16 represents a nonlimiting example of a “shaped” knife 70 having a cutting edge that defines a periodic pattern of peaks and valleys when viewed edgewise, and FIG. 17 shows the shaped knife 70 of FIG. 16 installed in the modular unit 76. As evident from FIG. 17, the shaped knife 70 has a greater effective thickness than the flat knife 70 of FIGS. 12 through 15, to the extent that the release position of the clamp 81 depicted in FIG. 14 may not be sufficient to release the shaped knife 70. This issue can be addressed by modifying the placement of the stop 114 that determines the release position of the cam rod 100. In particular, FIGS. 17 and 18 represent the result of rotating the camming portion 106 beyond the ninety-degree counterclockwise rotation permitted by the stop 114 of FIGS. 13 and 15. As depicted in FIGS. 17 and 18, the cam rod 100 has been rotated about 180 degrees from the clamping position, resulting in its camming portion 106 being at its greatest distance from the knife holder 80, which as evident from FIG. 17 is sufficient to enable the clamp 81 to release the shaped knife 70.

Figure 19:
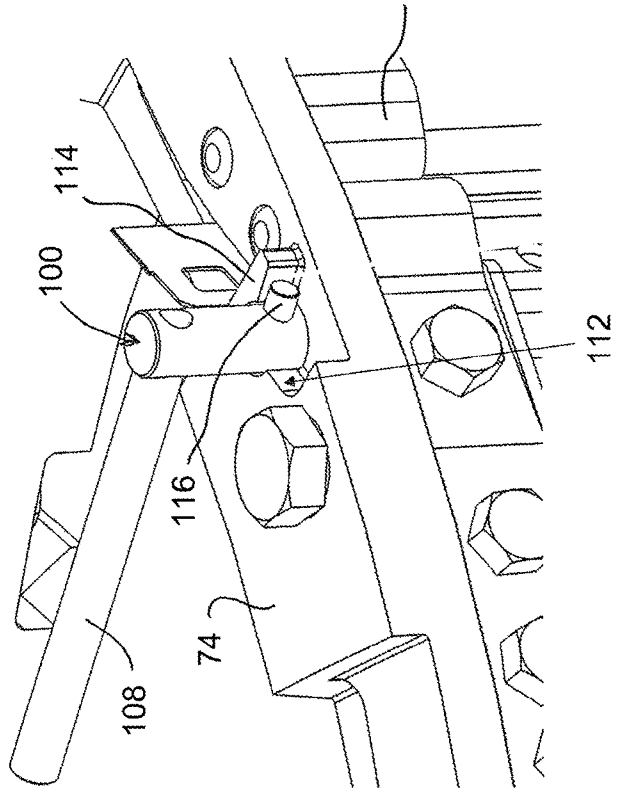
FIG. 19 is a perspective view of a cutting head showing stops for the lever that operates the modular unit in combination with the flat knife as depicted in FIGS. 12 through 15.
Figure 20:
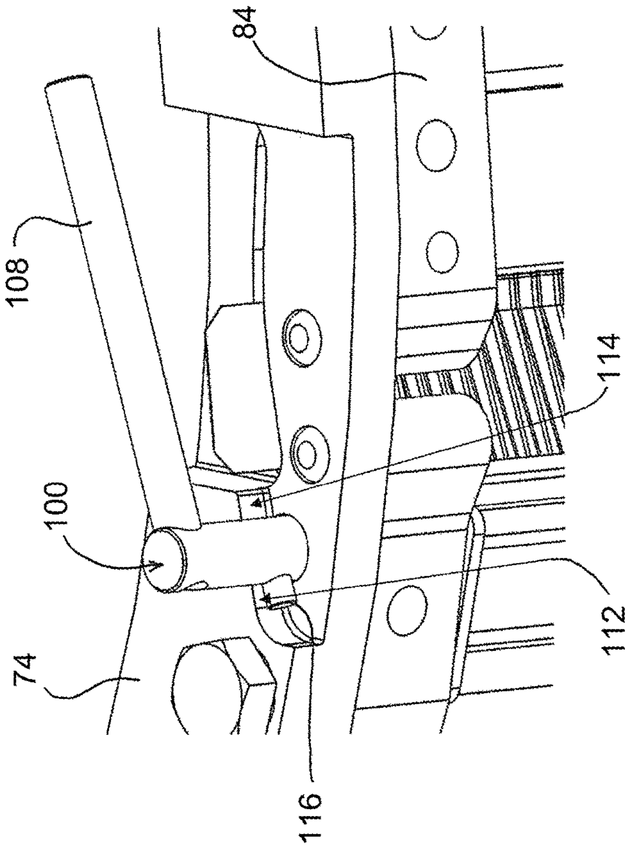
FIG. 20 is a perspective view of a cutting head showing stops for the lever that operates the modular unit in combination with the shaped knife as depicted in FIGS. 17 and 18.
Figures 21, 22, 23:
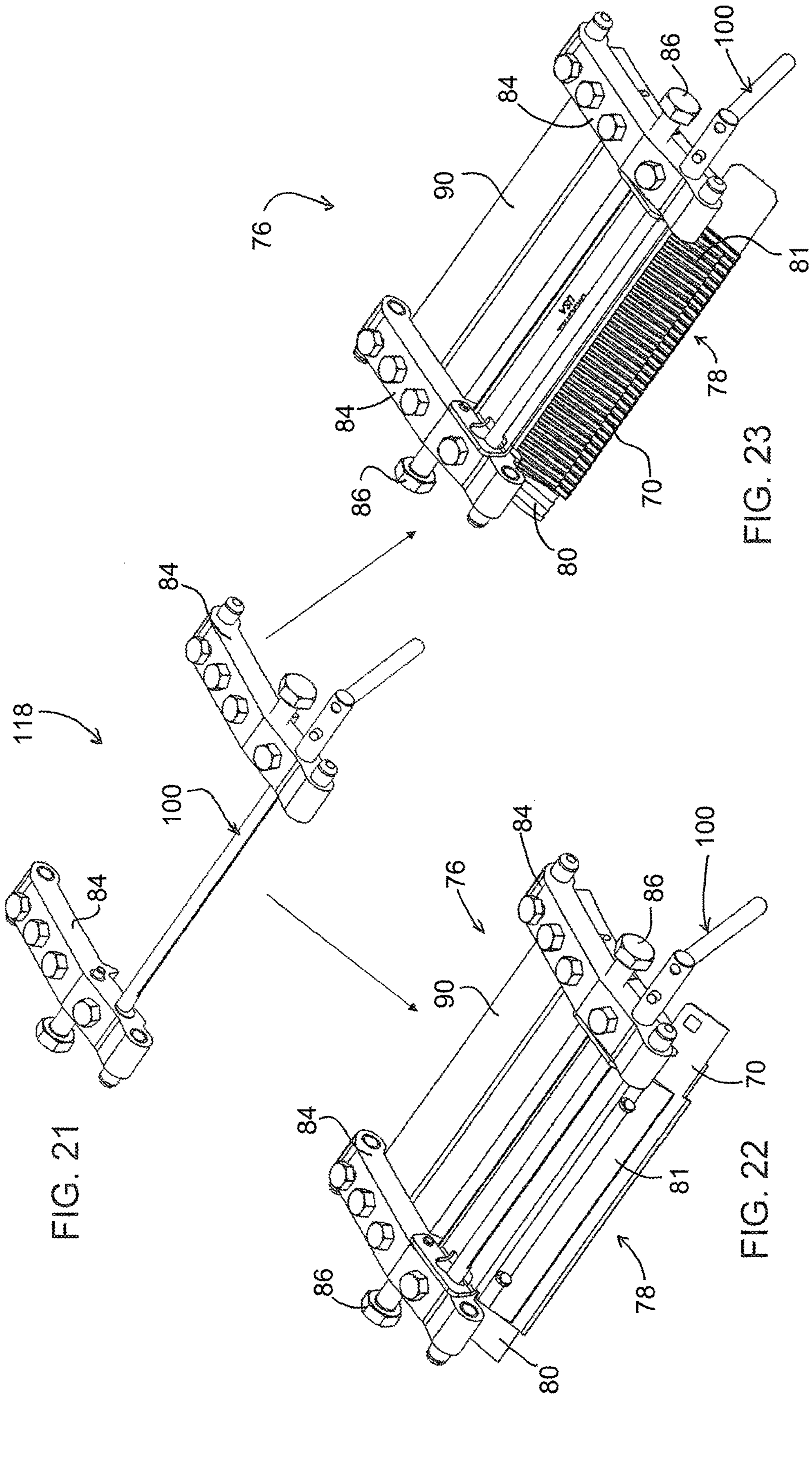
FIGS. 21, 22 and 23 are perspective views evidencing the modularity of the modular unit of FIGS. 8 through 20.

FIGS. 19 and 20 provide two perspective views to further illustrate different locations of the stop 114 resulting from the support ring 74 of the cutting head 62 being configured for clamping either flat knives 70 (FIG. 19) or shaped knives 70 (FIG. 20). From FIGS. 12 through 20, it should be evident that the extent to which the cam rod 100 is able to accommodate flat and shaped knives 70 can be tailored by the location of the stop 114, without necessitating modifications to the modular unit 76 itself. For example, the support ring 74 may be replaced or its stop 114 relocated or otherwise modified in an appropriate manner. However, a more optimal clamping effect can be achieved by appropriately shaping the knife holder 80 and clamp 81 to be complementary to the shape of the knife 70. The modular unit 76 is able to address this issue as a result of its modular construction, which permits holders 80 and clamps 81 of various configurations to be assembled to the mounting blocks 84. This preferred aspect of the invention is illustrated in FIGS. 21, 22 and 23. FIG. 21 represents the mounting blocks 84 and cam rod 100 as a subassembly 118 of the modular unit 76. In FIG. 22, a flat knife 70 and a knife holder 80 and clamp 81 specifically configured for use with the flat knife 70 (together constituting the clamping assembly 78) have been assembled with the subassembly 118, whereas FIG. 23 represents the same subassembly 118 as having been assembled with a different clamping assembly 78 comprising a shaped knife 70 and a knife holder 80 and clamp 81 specifically configured to have periodic patterns of peaks and valleys that are complementary to peaks and valleys of the shaped knife 70.

Figure 24:
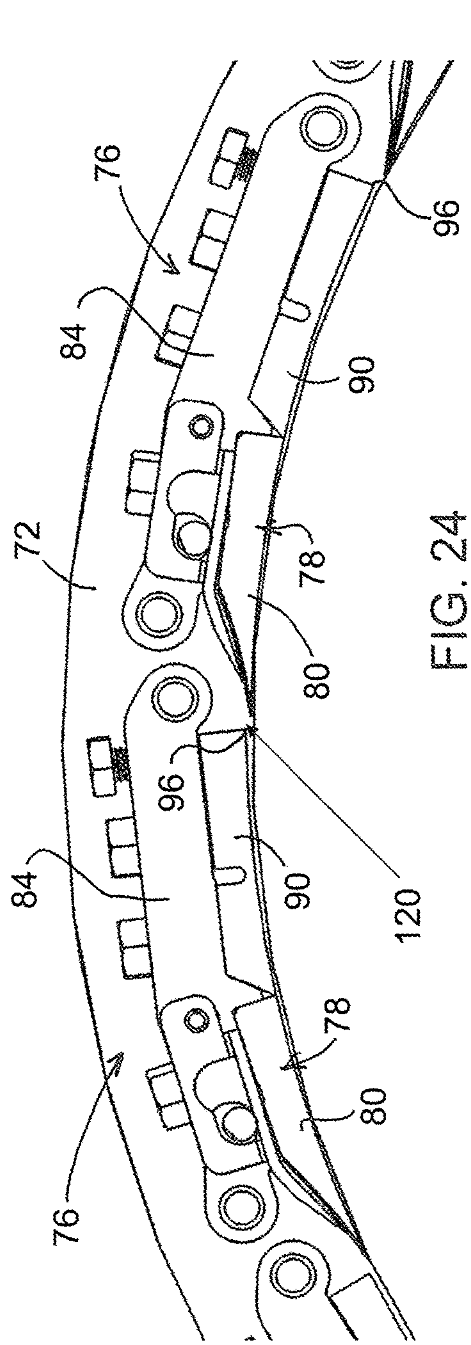
FIGS. 24 and 25 are end views of cutting heads showing the modular unit of FIGS. 8 through 23 installed on support rings of different size (diameters).
Figure 25:
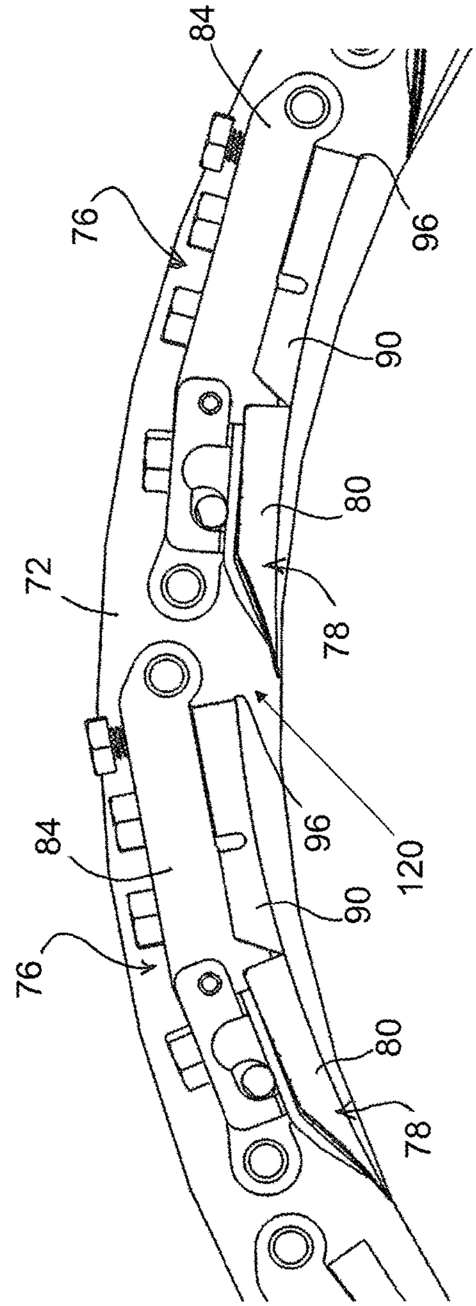

FIGS. 24 and 25 further illustrate the versatility of the modular unit 76 in terms of its adaptability for use with support rings 72 and 74 of various configurations and sizes (diameters). In particular, the placements of the mounting blocks 84 of the units 76 differ with respect to the support rings 72 in FIGS. 24 and 25. The trailing edges 96 of the gates 90 in FIG. 25 create larger gate openings 120 with their respective succeeding knives 70, causing the knives 70 in FIG. 25 to produce much thicker slices than what is produced with the identical units 76 shown in FIG. 24.

While the invention has been described in terms of specific or particular embodiments, it should be apparent that alternatives could be adopted by one skilled in the art. For example, the machine 10, cutting head 62, impeller 14, modular units 76, and their respective components could differ in appearance and construction from the embodiments described herein and shown in the drawings, functions of certain components could be performed by components of different construction but capable of a similar (though not necessarily equivalent) function, and various materials could be used in the fabrication of the machine 10, cutting head 62, impeller 14, modular units 76, and their respective components. In addition, the invention encompasses additional or alternative embodiments in which one or more features or aspects of the disclosed embodiment could be eliminated. Accordingly, it should be understood that the invention is not necessarily limited to any embodiment described herein or illustrated in the drawings. It should also be understood that the phraseology and terminology employed above are for the purpose of describing the illustrated embodiment, and do not necessarily serve as limitations to the scope of the invention. Finally, while the appended claims recite certain aspects believed to be associated with the invention, they do not necessarily serve as limitations to the scope of the invention.

The invention claimed is:

1. A slicing machine comprising an annular-shaped cutting head that comprises first and second support rings spaced apart in an axial direction of the cutting head, and a modular unit mounted to the cutting head, the modular unit comprising:

mounting blocks that are spaced apart from each other in the axial direction of the cutting head, a first of the mounting blocks being secured to the first support ring and a second of the mounting blocks being secured to the second support ring; and a clamping assembly assembled with the first and second mounting blocks so as to be between the first and second mounting blocks, the clamping assembly comprising a knife holder and a clamp arranged with the knife holder to clamp a knife between the knife holder and the clamp;

wherein the first and second mounting blocks are secured to the first and second support rings so that the knife holder, the clamp, and the knife are removable from the cutting head by disassembling the clamping assembly from the first and second mounting blocks without removing the first and second mounting blocks from the first and second support rings.

2. The slicing machine according to claim 1, further comprising a cam rod that overlies a radially outer surface of the clamp so that the clamp is between the cam rod and the knife and the cam rod secures the clamp to the knife holder, and the cam rod is operable to clamp and release the knife between the clamp and the knife holder by respectively engaging and disengaging the outer surface of the clamp.

3. The slicing machine according to claim 1, further comprising a cam rod that has oppositely-disposed ends rotatably coupled with the first and second mounting blocks and a camming portion between the oppositely-disposed ends that contacts a radially outer surface of the clamp, the cam rod being rotatable to have a clamping position and a release position to respectively clamp and release the knife between the clamp and the knife holder, the camming portion applying a force that clamps the clamp against the knife holder when the cam rod is in the clamping position, the camming portion releasing the force against the clamp when the cam rod is in the release position.

4. The slicing machine according to claim 3, wherein the camming portion of the cam rod comprises a cylindrical portion of the cam rod that contacts the clamp in the clamping position and disengages the clamp in the release position.

5. The slicing machine according to claim 3, wherein the cam rod is rotatably and eccentrically coupled to the first and second mounting blocks, the camming portion is closer to the knife holder in the clamping position, and the camming portion is farther from the knife holder in the release position.

6. The slicing machine according to claim 3, wherein the cam rod protrudes through a surface of the first support ring.

7. The slicing machine according to claim 6, further comprising a protrusion on the cam rod, a first stop that prevents rotation of the cam rod beyond the clamping position and a second stop that prevents rotation of the cam rod beyond the release position.

8. The slicing machine according to claim 7, wherein the first and second stops are defined by the first support ring.

9. A method of modifying the slicing machine of claim 8 by replacing the first support ring with a third support ring, wherein the location of the second stop of the first support ring is different than the location of the second stop of the third support ring so that the release positions established by the first and third support rings are different.

10. The method according to claim 9, wherein the release position established by the third support ring enables the clamping and releasing of a thicker knife than possible with the first support ring.

11. The method according to claim 10, wherein the thicker knife is a shaped knife having a periodic pattern of peaks and valleys.

12. The method according to claim 11, further comprising disassembling the clamping assembly from the first and second mounting blocks and assembling a second clamping assembly to the first and second mounting blocks, the second clamping assembly comprising a second knife holder and a second clamp that each have a periodic pattern of peaks and valleys that is complementary to the shaped knife.

13. The slicing machine according to claim 1, wherein the clamp has oppositely-disposed ends at which the clamp is pivotably coupled to the first and second mounting blocks.

14. The slicing machine according to claim 1, further comprising an adjustable gate that is assembled with the first and second mounting blocks so as to be between the first and second mounting blocks, the adjustable gate defining a trailing edge and being adjustably secured to the first and second mounting blocks so that the trailing edge thereof has an adjustable radial location on the cutting head.

15. The slicing machine according to claim 1, wherein the slicing machine further comprises an impeller coaxially mounted within the cutting head for rotation about the axis of the cutting head in a rotational direction relative to the cutting head, the impeller has means for delivering food products radially outward toward the cutting head, and the knife extends radially inward toward the impeller in a direction opposite the rotational direction of the impeller.

16. A modular unit configured for mounting to an annular-shaped cutting head of a slicing machine and for securing a knife to the cutting head, the cutting head comprising support rings spaced apart in an axial direction of the cutting head, the modular unit comprising:

first and second mounting blocks configured to be individually and separately secured to the support rings so that the first and second mounting blocks are spaced apart from each other in the axial direction of the cutting head; and a clamping assembly assembled with the first and second mounting blocks so as to be between the first and second mounting blocks, the clamping assembly comprising a knife holder and a clamp arranged with the knife holder to clamp the knife between the knife holder and the clamp;

wherein the first and second mounting blocks are configured to be secured to the support rings so that the knife holder, the clamp, and the knife are removable by disassembling the clamping assembly from the first and second mounting blocks without removing the first and second mounting blocks from the support rings.

17. The modular unit according to claim 16, further comprising a cam rod that overlies a radially outer surface of the clamp so that the clamp is between the cam rod and the knife and the cam rod secures the clamp to the knife holder, and the cam rod is operable to clamp and release the knife between the clamp and the knife holder by respectively engaging and disengaging the outer surface of the clamp.

18. The modular unit according to claim 16, further comprising a cam rod that has oppositely-disposed ends rotatably coupled with the first and second mounting blocks and a camming portion between the oppositely-disposed ends that contacts a radially outer surface of the clamp, the cam rod being rotatable to have a clamping position and a release position to respectively clamp and release the knife between the clamp and the knife holder, the camming portion applying a force that clamps the clamp against the knife holder when the cam rod is in the clamping position, the camming portion releasing the force against the clamp when the cam rod is in the release position.

19. The modular unit according to claim 18, wherein the camming portion of the cam rod comprises a cylindrical portion of the cam rod that contacts the clamp in the clamping position and disengages the clamp in the release position.

20. The modular unit according to claim 18, wherein the cam rod is rotatably and eccentrically coupled to the first and second mounting blocks, the camming portion is closer to the knife holder in the clamping position, and the camming portion is farther from the knife holder in the release position.

21. The modular unit according to claim 18, wherein the cam rod has a protrusion configured to abut a first stop that prevents rotation of the cam rod beyond the clamping position and a second stop that prevents rotation of the cam rod beyond the release position.

22. The modular unit according to claim 16, wherein the clamp has oppositely-disposed ends at which the clamp is pivotably coupled to the first and second mounting blocks.

23. The modular unit according to claim 16, further comprising an adjustable gate that is assembled with the first and second mounting blocks so as to be between the first and second mounting blocks, the adjustable gate defining a trailing edge and being adjustably secured to the first and second mounting blocks so that the trailing edge thereof has an adjustable radial location on the cutting head.

* * * * *